United States Patent [19]

Reimers

[11] Patent Number: 4,587,560

[45] Date of Patent: May 6, 1986

[54] METHOD OF IMPROVING TELEVISION SIGNAL-TO-NOISE RATIO

[75] Inventor: Ulrich Reimers, Ober-Ramstadt, Fed. Rep. of Germany

[73] Assignee: Robert Bosch GmbH, Stuttgart, Fed. Rep. of Germany

[21] Appl. No.: 616,931

[22] Filed: Jun. 4, 1984

[30] Foreign Application Priority Data

Jun. 11, 1983 [DE] Fed. Rep. of Germany ....... 3321222

[51] Int. Cl.⁴ .................... H04N 5/14; H04N 5/213; H04N 5/38
[52] U.S. Cl. .................................. 358/166; 358/167; 358/186
[58] Field of Search ............... 358/166, 167, 217, 44, 358/186; 313/390, 383; 315/384, 386

[56] References Cited

U.S. PATENT DOCUMENTS

| | | | |
|---|---|---|---|
| 2,055,593 | 9/1936 | Reynolds | 358/217 X |
| 2,293,899 | 8/1942 | Hanson | 358/217 |
| 4,104,679 | 8/1978 | Kitamura et al. | 358/44 |

FOREIGN PATENT DOCUMENTS 1021143 3/1966 United Kingdom ............... 358/217

*Primary Examiner*—Michael A. Masinick
*Assistant Examiner*—E. Anne Toth
*Attorney, Agent, or Firm*—Frishauf, Holtz, Goodman & Woodward

[57] ABSTRACT

The output signal of a television pickup tube is caused to appear in a carrier frequency range above the video frequency baseband without the interposition of preliminary baseband transmission. This is done by modulation at carrier frequency by any of a variety of methods that chops or modulates the signal as it is formed, at a frequency which should be in the neighborhood of 16 MHz for a video bandwidth of 5 MHz. The modulation may be done by breaking up the picture on the pickup electrode by an optical grid or similarly interposing a grid which interrupts the scanning beam that scans the electrode, in which cases the modulating frequency is related to the scanning rate. Electronic modulation of the beam can also be applied to a suitable part of the electron gun structure or to a special modulating control electrode. Operating the preamplifier in the carrier frequency range, with the transistor stage preceeded and followed by bandpass filters makes it possible to use transistors having a large amount of noise of a kind that diminishes with increasing frequency, after which the signal can be brought back to baseband for further processing by means of a demodulator.

13 Claims, 4 Drawing Figures

METHOD OF IMPROVING TELEVISION SIGNAL-TO-NOISE RATIO

This invention concerns the improvement of the signal-to-noise ratio of video signals originating in television cameras by projecting the frequency of the video signals to a carrier frequency region for amplification, after which, at some later stage, the frequency is shifted back to the video baseband.

In television cameras heretofore known the video signal at the output of the picture pickup tube is obtained and provided in the baseband frequency range. The significant signal components, accordingly, all lie, under present day practice, in the range from zero or near-zero up to 5 MHz. Signals in this baseband are amplified in the preamplifier. In that amplification noise components appear which decisively determine the resulting signal-to-noise ratio in the video signal.

Substantial reduction of these noise components is obtainable if amplifier transistors having better noise behavior than the previously used bipolar or silicon junction field effect transistors can be used in the preamplifier. At first sight the gallium arsenide (GaAs) field effect transistors and possibly also the MOS field effect transistors offer advantages. These, however, have strong noise components, varying inversely with frequency, at low frequencies (up to a few MHz). In order to be able to provide effective preamplifiers with these transistors, the signals processed by them must lie above these noise-disturbed frequency ranges. That would require the modulation of the video signals with a carrier and thus to make available a high frequency useful signal lying in the low-noise range of the amplifying semiconductors, rather than amplifying at baseband. If such a higher frequency signal is present, then circuit configurations could also be obtained which could profit from the practice in conventional high-frequency amplifiers to provide additional advantages regarding the obtainable signal-to-noise ratio, by virtue of the fact that otherwise interfering capacitances of the picture tube and of the amplifier could be compensated by integration of these capacitances in resonant circuits or the like.

A video preamplifier is disclosed in German published patent application DE-OS No. 31 19 871 (U.S. Ser. No. 377.601, filed 5/13/82) in which the signal obtained from the pickup tube, which is a video signal occupying the baseband frequency region, is modulated and thus translated into a carrier frequency region before amplification.

This attempt to follow the line of progress above outlined failed, however, because the problems of electronic processing of a baseband signal were not, in principle, circumvented even though the preamplifier was supplied with a carrier frequency video signal, for the baseband video signal had already been processed in the baseband region before modulation with the usual degradation of the signal-noise ratio.

SUMMARY OF THE INVENTION

It is an object of the present invention to provide a method of improving the signal-to-noise ratio of video signals originating in television cameras in which the video signal is already frequency-converted into a carrier frequency range at the output of the signal electrode of the pickup tube, namely the electrode which produces signal current under the conditions of optical illumination and electronic scanning.

Briefly, the provision of a signal electrode output in the carrier frequency range is performed either by breaking up the optical illumination into thin strips separated by dark strips so disposed that a modulation of the signal electrode output will result from the usual scanning, or else by modulating the electron beam, either by interposition of a grid for interrupting the electron beam periodically as it scans the signal electrode or else by applying a modulation frequency to the electron beam in the electron gun region, by applying that frequency either on the cathode or on a control grid and, in each case, by applying either a sinusoidal modulation or a pulse modulation, the latter intermittently interrupting the beam.

Then, to obtain the advantages with an output signal that is already in the carrier frequency range at its inception, the signal is filtered to remove baseband frequencies that may be Present, amplified and preferably filtered again before demodulation to remove low-frequency noise and, after demodulation, to remove harmonics and high-frequency residues.

The invention has all the advantages previously sought in vain by previous schemes of preamplification in the carrier frequency range. Because the video signal first appears in electrical form already in the carrier frequency range without any previous electrical transmission in the baseband range even in the picture tube, there is no deterioration in the signal-to-noise ratio, characteristic of baseband transmission or processing at low signal levels. Thus, not only is the use of higher quality transistors in the preamplifier now possible, but also new preamplifier concepts can be used with further improvement of the results. In addition, it is also possible at the same time to eliminate low-frequency disturbances that have heretofore been troublesome, for example, those derived from the scanning current circuits.

BRIEF DESCRIPTION OF THE DRAWINGS

The invention is further described by way of illustrative examples with reference to the annexed drawings, in which.

DESCRIPTION OF THE ILLUSTRATED METHOD AND EMBODIMENTS

Figure 1:
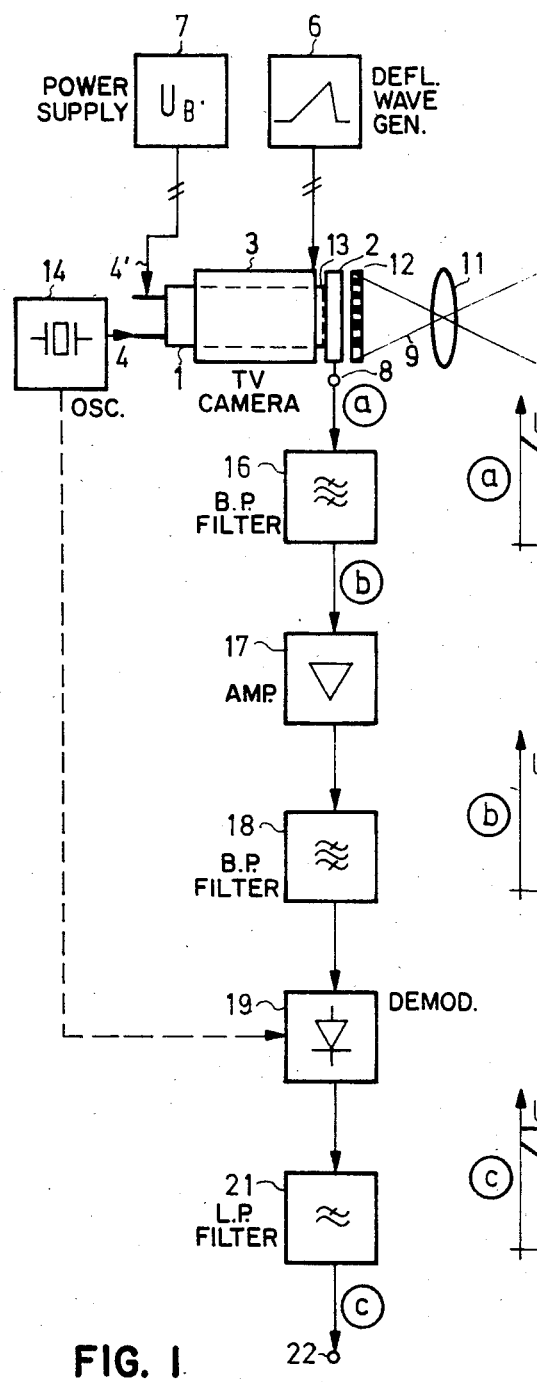
FIG. 1 is a block circuit diagram of apparatus for carrying out the invention with a different embodiment indicated by a broken-line connection.

FIG. 1 shows a picture pickup tube 1 having a signal electrode 2, a deflection unit 3 for deflecting an electron beam and various connection prongs 4,4'. A deflection wave generator 6 provides the deflection current for the deflection unit 3 and a power supply 7 provides the beam current for the pickup tube 1 through the connection prong 4'. Other electrode connections and energizing arrangements that may be necessary for the pickup tube, and may vary according to its type, are omitted in order to simplify the drawing.

In order to produce a video signal which is frequency-translated to a carrier frequency at the output 8 of the signal electrode 2 there is the possibility, among others, to provide an optical grid structure 12 which may be referred to as a strip filter because it breaks up the illuminated areas into narrow strips parallel to each other and to dispose this grid or strip filter in the light path 9 leading from the objective lens 11 to the signal electrode 2 on which the light is incident. The grid or strip filter provides an alternating sequence of transparent and opaque strips.

The brightness-subdivided image is then scanned in such a way that the desired modulation is obtained. In order to produce a video signal with a bandwidth of 5 MHz, the carrier frequency could advantageously lie between 15 and 20 MHz, for example. For a 1-inch pickup tube, then, 780 to 1040 strip pairs (one transparent and one opaque) having a width per pair between 16.4 μm and 12.3 μm would be necessary. The frequency actually to be obtained then would be selected in dependence upon the modulation transmission function of the optical device, considered as a filter effective before scanning. The basic data for determining from which a suitable fitting of the carrier frequency to the optical grid is to be found in the applicant's dissertation of 1982 at the Technical University of Braunschweig: U. Reimers "Zur Auflosung von Fernsehkameras mit Halbleiter-Bildsensoren" (On the Resolution of Television Cameras Using Semiconductor Picture Sensors).

Another possibility for generating a video signal translated into the carrier frequency region at the signal electrode 2 consists in the use of a parallel grid 13 on the side of the signal electrode 2 facing the cathode of the pickup tube 1, more or less as is inserted in similar form in the so-called Trinicon tubes made by Sony. The electron beam is then always interrupted whenever it meets the blocking strips, usually metallic, of the parallel grid 13.

For producing a video signal translated into the carrier frequency range at the output 8 of the signal electrode 2 it is also possible to interrupt the electron beam scanning the signal electrode 2 or to modulate it periodically in intensity (e.g. sinusoidally). A complete interruption can be produced by pulse modulation. The modulation frequency suitable for this should again fall between 15 MHz and 20 MHz in order to generate most advantageously a video signal having a bandwidth of 5 MHz.

A modulation frequency generator 14 for delivering a carrier frequency signal of about 16 MHz is shown in FIG. 1 to illustrate this option. It is connected through the camera tube prong 4, either with the cathode or with a control grid, for example, the first grid of a triode beam forming system or a separate control grid utilized particularly for beam modulation.

Figure 2A:
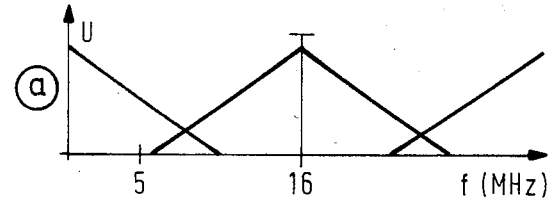
FIG. 2a is a frequency spectrum diagram of the camera output of FIG. 1 before band filtering.

The signal spectrum of the video modulated carrier frequency available at the output 8 is illustrated in FIG. 2a It consists essentially of a baseband portion (from 0 to e.g. 10 MHz) and a multiplicity of carrier frequency sideband components which are grouped around multiples of the modulating high frequency. In the case of a modulating frequency of e.g. 16 MHz, the sideband components of lowest order would extend over the range from 6 MHz to 16 MHz and from 16 MHz to 26 MHz respectively.

Figure 2B:
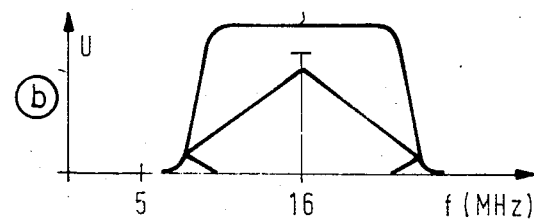
FIG. 2b is a diagram of the band-pass of the filter 16 of FIG. 1.

A bandpass filter 16 is connected directly to the output 8 of the television pickup tube. It allows only the frequency in the carrier frequency region extending from about 6 to 26 MHz to pass, so that at its output there is obtained a signal of a spectrum shown in FIG. 2b. The chief advantage of the use of this band filter 16, however, lies in the compensation of the inherent capacitance of the pickup tube and the input capacitance of the following preamplifier stage 17, which in this case can be incorporated as components of the band filter 16.

The preamplifer 17 can utilize optimum transistors (e.g. GaAs transistors), since no account needs to be taken of their strong characteristic noise (Funkel noise) that varies in magnitude inversely as the frequency, since the low-frequency noise components are eliminated in the second bandpass filter 18. A demodulator is 19 connected to the output of the second bandpass filter 18 and converts the signal components lying between 6 and 26 MHz to signals in the frequency range from 0 to 10 MHz. The line connection between the modulating frequency generator 14 and the demodulator 19 indicates a connection that becomes necessary if the demodulator 19 is designed as a synchronous demodulator, which is a possibility when a modulation frequency source like the generator 14 is used. Synchronous demodulation could also be used when the modulation frequency is provided by the grid 12 or by the grid 13, but that would require means for detecting the carrier frequency and either amplifying it or having it synchronize an oscillator by a phase-locked loop circuit.

Although in the circuit of FIG. 1, only the signal processing by the bandpass filters 16 and 18 and by the transistor preamplifier 17 takes place while the signal is in the carrier frequency range, it is, of course, possible to perform more of the signal processing while the signal is in the carrier frequency range.

Figure 2C:
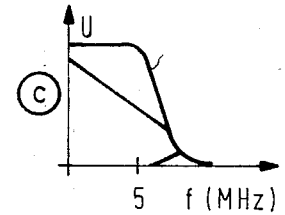
FIG. 2c is a frequency diagram of the pass characteristic of a low-pass filter 21 of FIG. 1.

After the signal is brought back to the baseband range by the demodulator 19 it goes to a low-pass filter 21, connected to the output of the demodulator, which eliminates harmonics and residues of higher frequencies and once more, limits the noise bandwidth. A video signal at baseband with a spectrum in the frequency range illustrated in FIG. 2c which shows the characteristic of the low-pass filter 21, is then made available with an improved signal-to-noise ratio at the output terminal 22 of the low-pass filter 21.

Although the invention has been described with reference to particular illustrative examples, it will be understood that further variations and modifications are possible within the inventive concept.

I claim:

1. Method of improving the signal-to-noise ratio of video signals originating in a television camera comprising the steps of:

shifting the frequency the spectrum of the camera output signals into a carrier frequency region at the very inception of said signals in the pickup tube (1) by interrupting the incidence of the picture light on the signal electrode (2) of the pickup tube by a fine grid interrupting light of all colors and so oriented with respected to the signal electrode that the scanned video signal will appear as modulation of a suitable carrier frequency;

filtering the output signal of said picture tube for suppression of video baseband frequency signals, and amplifying the filtered signals at frequencies in the carrier frequency region before reconverting the filtered signals to the video baseband frequency range for further processing.

2. Method according to claim 1 in which the step of amplifying filtered signals is performed by use of an amplifier utilizing gallium arsenide (GaAs) transistors as amplifying elements and in which after the step of amplifying filtered signals in the carrier frequency range and before reconverting to the video baseband range by demodulation, said amplified signals are subjected to a second stage of filtering for suppression of low-frequency noise components, and in which after reconversion of the video baseband range by demodulation, the signals are subjected to low-pass filtering for suppression of harmonics and other higher frequency residues.

3. Method according to claim 1 in which the step of amplifying filtered signals is performed by use of an amplifier having MOS field effect transistors as amplifying elements and in which, after the step of amplifying filtered signals in the carrier frequency range and before reconverting to the video baseband range by demodulation, said amplified signals are subjected to a second stage of filtering for suppression of low-frequency noise components, and in which after reconversion to the video baseband range by demodulation, the signals are subjected to low-pass filtering for suppression of harmonics and other higher frequency residues.

4. Method of improving the signal-to-noise ratio of signals produced by television cameras having a pick-up tube equipped with a signal electrode, comprising the steps of modulating the electric current of the signal electrode (2) of the pick-up tube (1) generated by a scanning electron beam on said signal electrode while said signal electrode is illuminated, by modulating the electrode beam current at a carrier frequency suitable for amplification of the resulting signals in the carrier frequency range, the modulation of the electron beam current being performed by interposing a grid on the electron beam side of said signal electrode (2) of said pick-up tube (1) so oriented that the scanning operation results in modulation of the beam current reaching the signal electrode as a suitable modulation frequency for amplification of the output signal in the carrier frequency range;

filtering the output signals of said signal electrode for suppressing video baseband signals; and amplifying the filtered signals resulting from the filtering step and reconverting the resulting amplified signals in a subsequent stage to the video baseband range by demodulation.

5. Method according to claim 4 in which the steps of amplifying filtered signals is performed by use of an amplifier having gallium arsenide (GaAs) field effect transistors as amplifying elements and in which between the amplification step and the reconversion by demodulation step, a second filtering step is provided for suppression of low-frequency noise components produced in the amplification step, and in which after the reconversion by demodulation step, low-pass filtering is performed on the demodulated signal for suppression of harmonics and other high-frequency residues.

6. Method according to claim 4 in which the grid is of metal with parallel metal grid elements.

7. Method according to claim 5 in which the step of modulating the electron beam current is produced by periodic intensity modulation of the electron beam by means of a control electrode of the pickup tube (1).

8. Method according to claim 5 in which the modulation of the electron beam is performed by means of periodic pulse modulation of the electron beam of a type producing complete interruption of the beam current by successive pulses, said pulses being applied to a control electrode of said pickup tube.

9. Method according to claim 7 in which said control electrode of said pickup tube is the cathode thereof.

10. Method according to claim 8 in which said control electrode of said pickup tube is the cathode thereof.

11. Method according to claim 7 in which said control electrode of said pickup tube is a control grid.

12. Method according to claim 8 in which said control electrode of said pickup tube is a control grid.

13. Method according to claim 5 in which the step of amplifying filtered signals is performed by use of an amplifier having MOS field effect transistors as amplifying elements and in which between the amplification step and the reconversion by demodulation step, a second filtering step is provided for suppression of low-frequency noise components produced in the amplification step, and in which after the reconversion by demodulation step, low-pass filtering is performed on the demodulated signal for suppression of harmonics and other high-frequency residues.

* * * * *

UNITED STATES PATENT AND TRADEMARK OFFICE
CERTIFICATE OF CORRECTION

PATENT NO. : 4,587,560
DATED : May 6, 1986
INVENTOR(S) : Ulrich REIMERS

It is certified that error appears in the above-identified patent and that said Letters Patent is hereby corrected as shown below:

Column 6, line 34, Claim 13 should be dependent on Claim 4.

Signed and Sealed this

Twenty-fourth Day of March, 1987

Attest:

DONALD J. QUIGG

*Attesting Officer*  *Commissioner of Patents and Trademarks*